United States Patent [19]
Arena

[11] 4,061,248
[45] Dec. 6, 1977

[54] MULTI-FLAVOR WHIP CREAM APPARATUS

[76] Inventor: Vincent Arena, R.R. No. 1, Box 82A-3, Stockholm, N.J. 07460

[21] Appl. No.: 721,313

[22] Filed: Sept. 7, 1976

[51] Int. Cl.² .............................................. B67D 3/00
[52] U.S. Cl. ..................................... 222/4; 222/145; 222/488; 222/563; 239/432
[58] Field of Search ............... 222/132, 145, 485, 488, 222/563, 4, 129.1, 129.3, 129.4, 133, 134; 239/304, 310, 432

[56] References Cited
U.S. PATENT DOCUMENTS

| 1,160,448 | 11/1915 | Ross | 222/145 |
| 1,334,523 | 3/1920 | Cornish | 222/145 X |
| 1,590,578 | 6/1926 | Harris et al. | 222/145 |
| 2,356,048 | 8/1944 | Goddeau | 239/432 X |
| 3,174,652 | 3/1965 | Villemure | 222/145 X |

Primary Examiner—Drayton E. Hoffman
Assistant Examiner—Fred A. Silverberg
Attorney, Agent, or Firm—Mel K. Silverman; David A. Jackson

[57] ABSTRACT

The present invention relates to an apparatus adapted for a special whip cream dispensing function, characterized by a combination of types of fluid flow channels including, as the central portion thereof, two concentric annuli which enable the apparatus to produce the present multi-flavor characteristic.

2 Claims, 18 Drawing Figures

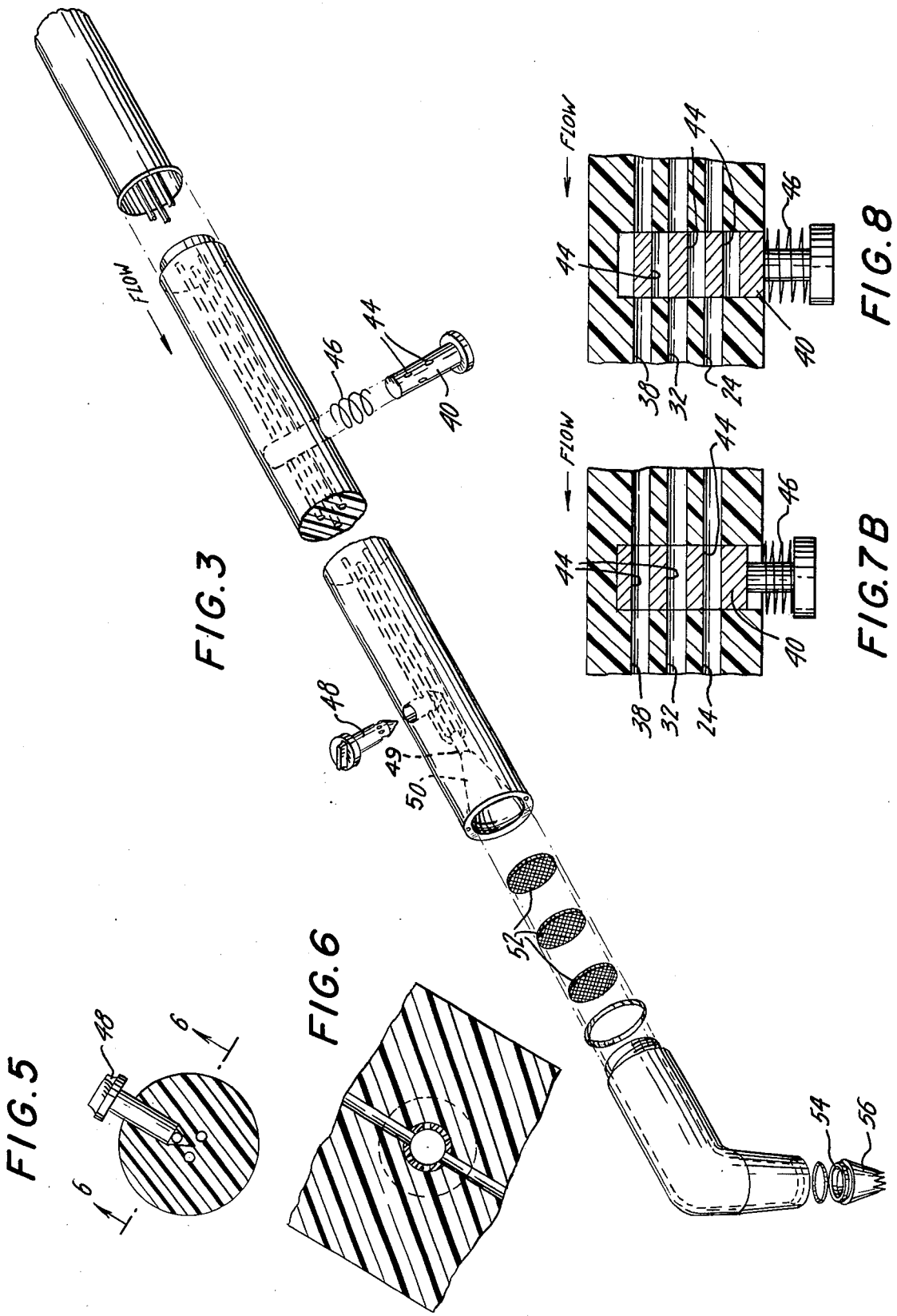

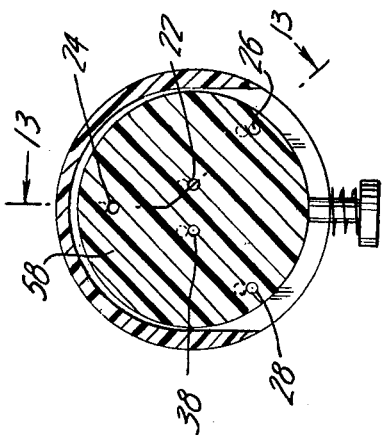
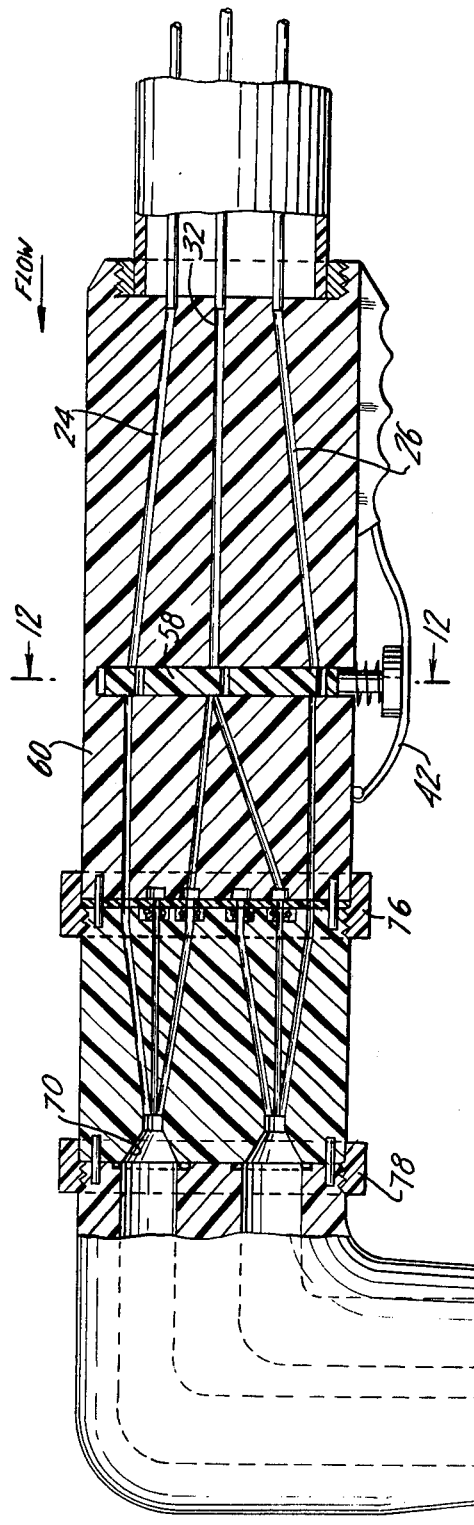
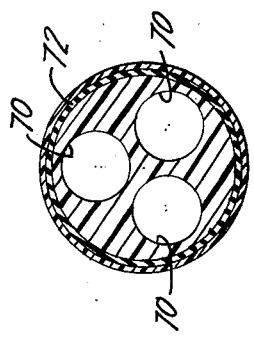

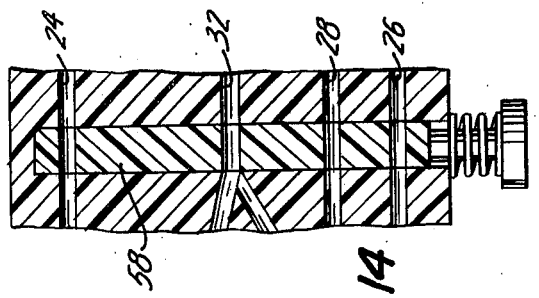
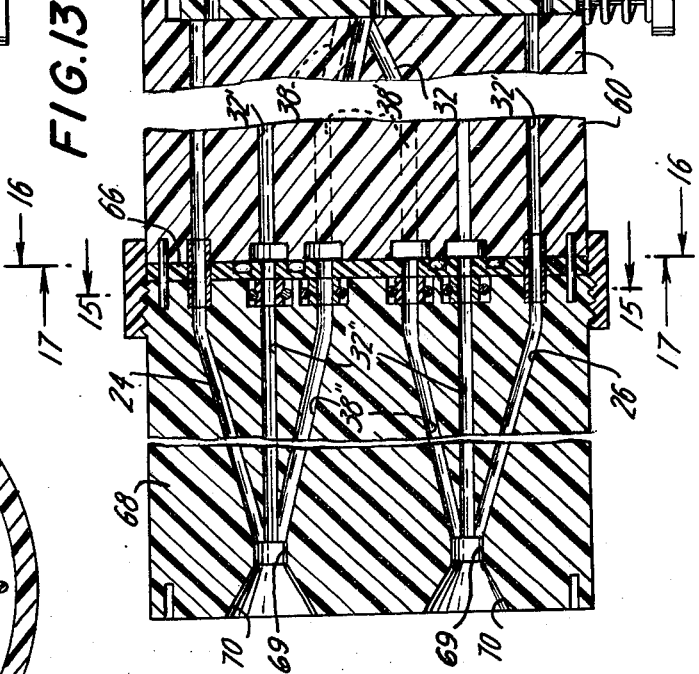
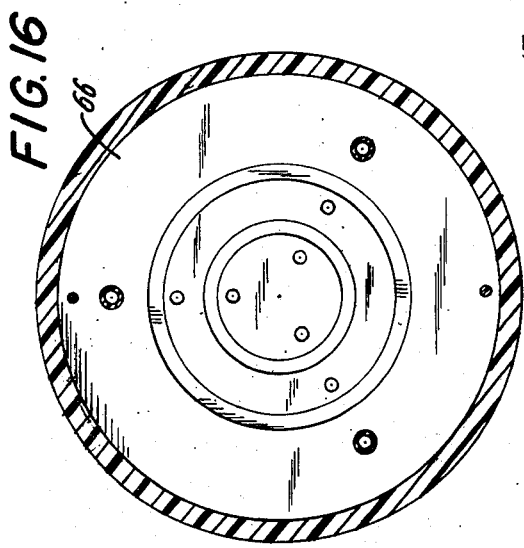
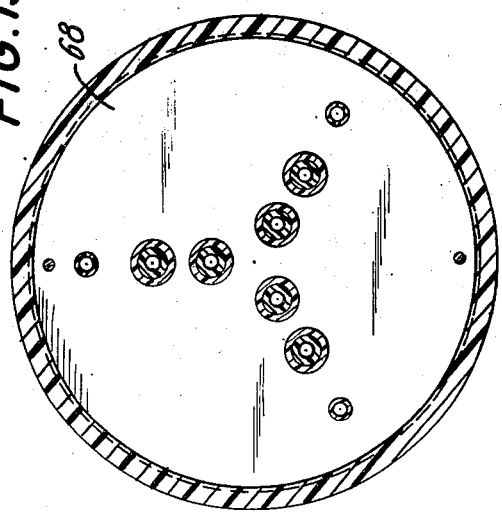
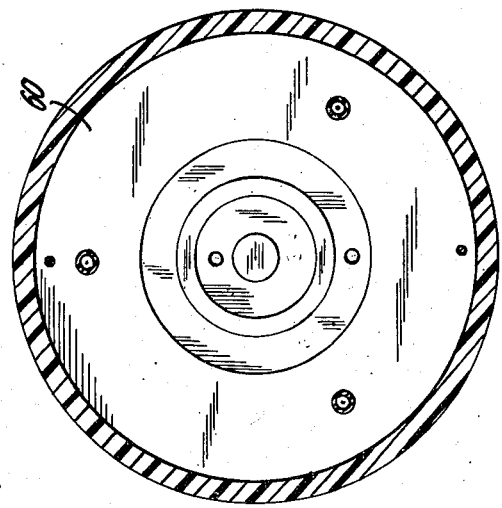

MULTI-FLAVOR WHIP CREAM APPARATUS

BACKGROUND OF THE INVENTION

The present invention relates to special refrigeration units adapted to the preparation of whipped cream and ice cream. More particularly, the present apparatus relates to a whip cream machine particularly adapted for delivery of a plurality of different flavored or colored creams within a single nozzle.

The prior art in the present field is represented by such patents as U.S. Pat. Nos. 3,017,165 (1962) to Idzi; 3,168,217 (1962) to Nilson; and 3,606,266 (1971) to Mc Mannis.

The above art, while all relating to apparatus for the production of whipped creams or, as they are commonly known, comestible products, do not possess a capability for the formation of a multi-color cream output in which all colors are obtainable through a single output nozzle.

The need for the present invention has, in part, derived from recent changes in the food service industry that have placed competitive pressures upon conventional type whip cream machines. That is, the present competitive market has placed a premium on particular characteristics of taste and appearance. Accordingly, the present apparatus is intended to produce an end-product having both a unique appearance and a texture and taste superior to that obtainable through the above prior art.

SUMMARY OF THE INVENTION

The present invention includes a pressurized refrigerated unit capable of producing whip cream and having a plurality of separate colors therein and dispensed through a plurality of hose and nozzle assemblies.

Both the cream and the coloring materials emmanate from separate pressurized tanks. The present device is conveniently enclosed within a refrigerated cabinet.

The colored-cream delivery system is accomplished through the use of a novel three-phase fluid flow and ducting system which includes a plurality of concentric annuli-shaped channels. Through said system, the delivery of three different colored creams within a single nozzle is attained.

Accordingly, it is an object of the present invention to provide a device for the provision of ice cream of a variety of colors and flavors.

It is a further object of the present invention to provide a device of the above type capable of providing a plurality of different colors and flavors within a single output nozzle.

It is a yet further object of the present invention to provide a pressurized refrigerated apparatus particularly adapted for ease of dispensement of a plurality of different flavors, colors and textures of ice cream and/or whip cream.

BRIEF DESCRIPTION OF THE DRAWINGS

FIG. 3 is an exploded perspective view of the first four nozzle assemblies, adapted for the dispensing of either plain or single-color whip cream.

FIG. 5 is a radial cross-sectional view taken along line 5—5 of FIG. 4.

FIG. 6 is an axial cross-sectional view taken along line 6—6 of FIG. 5.

FIG. 8 is a view, similar to that of FIG. 7, however, showing the plunger in a closed, non-flow condition.

FIG. 10 is an enlarged cross-sectional view of the multi-flavor nozzle.

FIG. 11 is a radial cross-sectional view taken along line 11—11 of FIG. 10.

FIG. 12 is a radial cross-sectional view taken along line 12—12 of FIG. 10.

FIG. 13 is a one-third longitudinal axial view of the apparatus of FIG. 10 taken along line 13—13 of FIG. 12.

FIG. 14 is a cross-sectional longitudinal fragment showing the plunger assembly of FIG. 10 and 13 in an open condition.

FIG. 15 is a radial cross-sectional view taken along line 15—15 of FIG. 13.

FIG. 16 is a radial cross-sectional view taken along line 16—16 of FIG. 13.

FIG. 17 is a radial cross-sectional view taken along line 17—17 of FIG. 13.

DETAILED DESCRIPTION OF THE INVENTION

Figure 1:
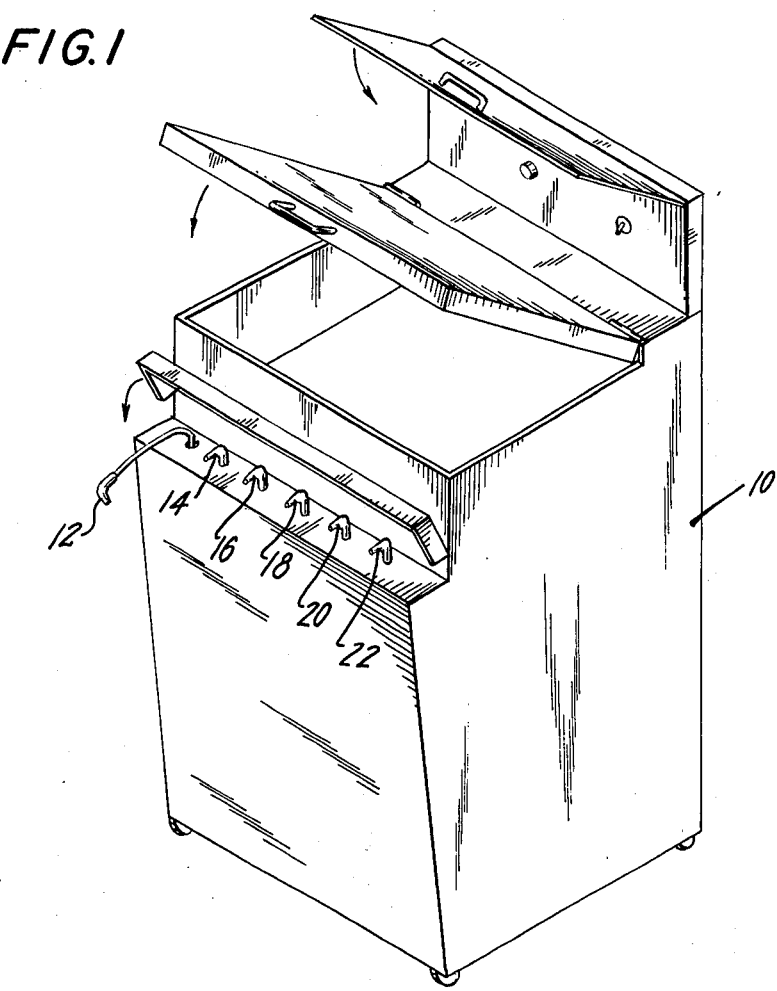
FIG. 1 is a perspective view of a whip cream dispensing apparatus within which the present invention may be housed.

There is shown in FIG. 1 a perspective view of the dispensing console within which the present inventive apparatus may be housed.

With further reference to FIG. 1, it may be noted that the console 10 is provided with six nozzles 12, 14, 16, 18, 20, and 22 respectively. Each of the first four nozzles 12 through 18 are provided with three inputs thereto, said inputs being color, cream and air. Accordingly, nozzles 12 through 18 are the colored or flavored cream nozzles. The fifth nozzle, nozzle 20, possesses only two inputs, namely, cream and air. Thus, nozzle 20 provides plain white uncolored or unflavored cream. The sixth nozzle 22 is provided with five inputs, namely, three color or flavor inputs in addition to inputs of cream and air. Thus, the sixth nozzle, as will be described hereinafter, produces the so-called multi-color or multi-flavor capability of the present system.

Figure 7A:
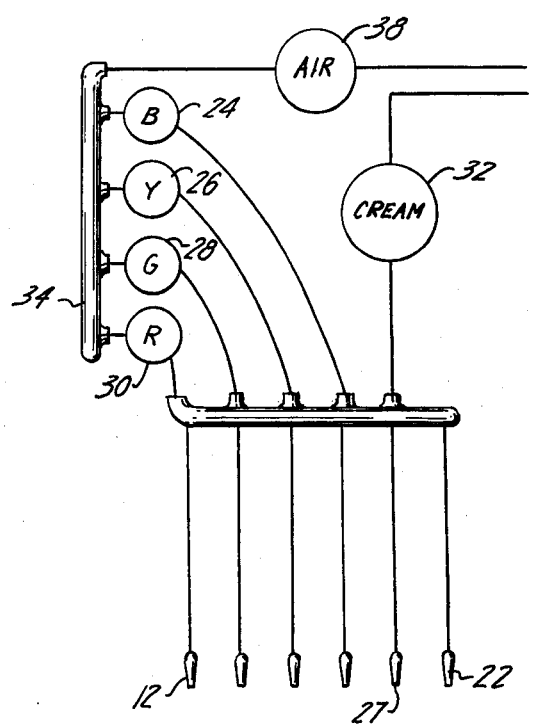
FIG. 7 is a cross-sectional schematic view of the plunger assembly of FIG. 3 and its interrelationship to the cream, air, and flavor channels, wherein the plunger is shown in an open, flow-permitting condition.
Figure 2:
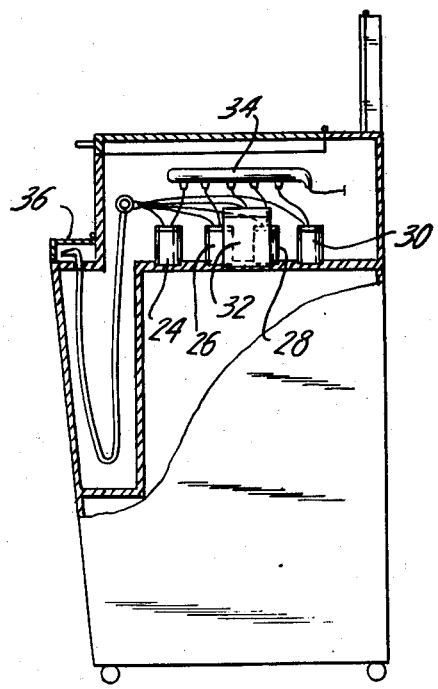
FIG. 2 is a side cross-sectional view of the cabinet of FIG. 1 showing the pressurized containers utilized in association with the present invention.

The internal arrangement of the present system is shown in further detail in FIG. 2 in which there is shown disposed the four coloring or flavoring containers 24, 26, 28, and 30 respectively. Also, there is shown the larger pressurized tank 32 which is used in order to store the uncolored liquid cream. Also shown in FIG. 2 is a manifold 34 which enables the cream, coloring material, and air to be piped under pressure into the various nozzles. The view of FIG. 2 is shown schematically in FIG. 7 which displays the relationship among the various inputs into the plurality of nozzles 12 through 22. In FIG. 7, the letters B, Y, G, and R are symbolic representations of one coloring arrangement which may be used, namely, blue, yellow, green, and red.

With further reference to FIGS. 2 and 7, it is noted that a cover 36 is provided at a lower level in the front of the machine in order to cover each of the six nozzles when they are not in use as well as to provide a sanitary receptacle for said nozzles. In the absence of such a cover, ambient air might cause a contamination of the product. Also, all nozzle and hose assemblies are of the retractile type thereby leading to the automatic withdrawal of the hose back into the console when it is not being held by the operator. Said retractile feature provides a sanitary arrangement, far superior to prior art systems. Also, ease of dispensement is attained.

Figure 4:
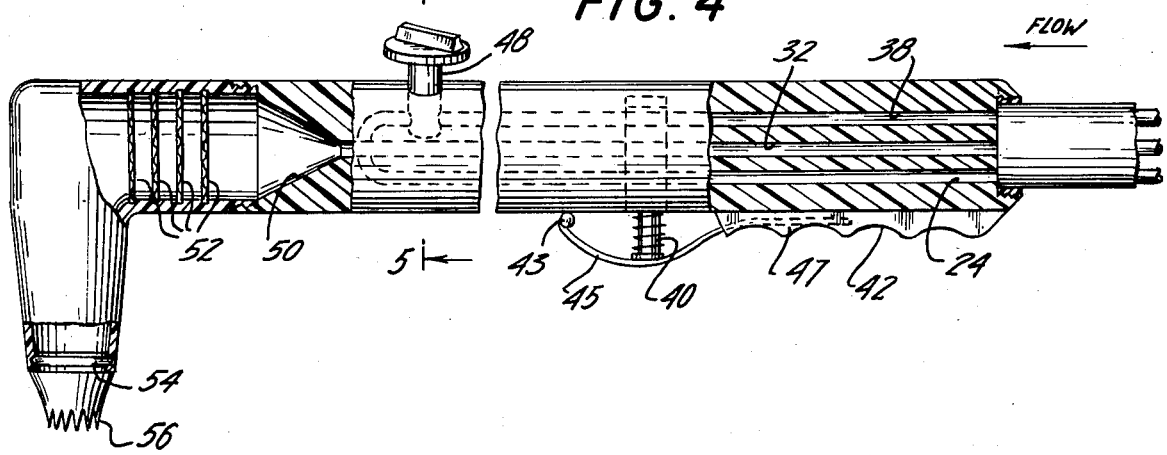
FIG. 4 is a side cross-sectional view of a nozzle utilized in association with either plain cream or cream having a single color.

The general construction of the first four nozzles 12 through 18 is generally shown in FIGS. 3 and 4. In said figures, there is shown three input lines 24 (representing the color or flavor line), 32 (representing the cream line), and 38 (representing the air line). As may be noted in FIGS. 3 and 4, the fluid flow continues unimpeded through said lines 24, 32, and 38 until reaching of the plunger 40 which serves in conjunction with a manually actuated handle grip 42 to perform an on/off function with respect to all of said three lines. This function is shown more fully in FIGS. 7 and 8. More particularly, there is in FIG. 8 shown the normally closed position of the plunger 40. It is to be noted that such closure is effectuated by virtue of the positioning of the holes 44 (see FIGS. 3 and 8) with respect to the lines 24, 32, and 38. Each positioning is obtained by virtue of the natural bias of a spring 46 which maintains the holes in the disposition shown in FIG. 8. In order to open the fluid channels 24, 32, and 38, the plunger 40 is simply depressed, in the manner shown in FIG. 7, such that the alignment of the plunger holes 44 conforms to the position of the fluid lines. This is easily achieved through the application of hand pressure to the handle of the nozzle (see FIG. 4).

After the fluids pass through the plunger area, they then reach a needle valve assembly 48, the function of which it is to control the air-to-cream ratio within the final product. More particularly, the needle valve 48 is positioned so as to interact with the cream line 32 and, through the selective turning of said needle valve, to control the amount of cream flowing through the line 32. For example, by increasing the amount of cream flow, a product having a heavier composition will be attained; while by reduction of the quantity of cream flow, a product having a reduced weight or greater fluffiness will be attained. Following the needle valve, all three lines merge into a single channel 49, from which they are introduced into a blender area comprising conically diverging, increased diameter expansion chamber 50, wherein they are thoroughly mixed. While in chamber 50, the mixed material through a plurality of screens or filters 52 which act to provide it with a homogenous quality. Following the screens, the ice cream or whip cream passes into the orifice of the nozzle 54 and ultimately out through the nozzle tip 56.

With respect to the fifth nozzle, that is, nozzle 20, the configuration of FIGS. 3 and 4 may be used; however, there is simply no input within the color line 24.

Turning to FIG. 10, there is shown in fuller detail the actual operation of the multi-color valve assembly. In FIG. 10, it is to be noted that displayed along the axis of the nozzle is cream line 32. However, as noted in FIG. 12, immediately behind the cream line 32 (however not shown in FIG. 10) is the air line 38. Also shown in FIG. 10 is a first color line 24 and a second color line 26. A third color line 28, while shown in FIG. 12, is hidden in FIG. 10.

The fluid flow in FIG. 10 proceeds without interruption until the reaching of plunger disc 58 which functions in a manner generally analogous to that of plunger 40 in the embodiment of FIG. 3. More particularly, the disc 58 occupies a normally off condition as shown in FIG. 10 in that its apertures (shown in FIG. 12) are normally out of alignment with the flow lines 24, 26, 28, 32, and 38. In order to permit a flow to occur, the handle 42 is simply depressed in order (as shown in FIG. 14) to bring the apertures of the disc into alignment with the fluid channels within the handle. It is, in FIGS. 15 and 16, to be noted that the disc 58 is provided with a sealing means on both interfaces with the flow channels in order to prevent possible leakage from said channels.

With further respect to FIG. 4, it is to be noted that element 43 comprises a removable pin, which, upon removal, will permit the handle lever 45 to be slidably removed from the handle 42. This procedure involves removal of the tongue 47 from the handle 42.

Through the removal of the handle lever 45, the plunger 40 may be removed and, thereafter, appropriately cleaned. A similar procedure may be used with respect to the disc plunger 58 shown in FIG. 10.

Figure 9:
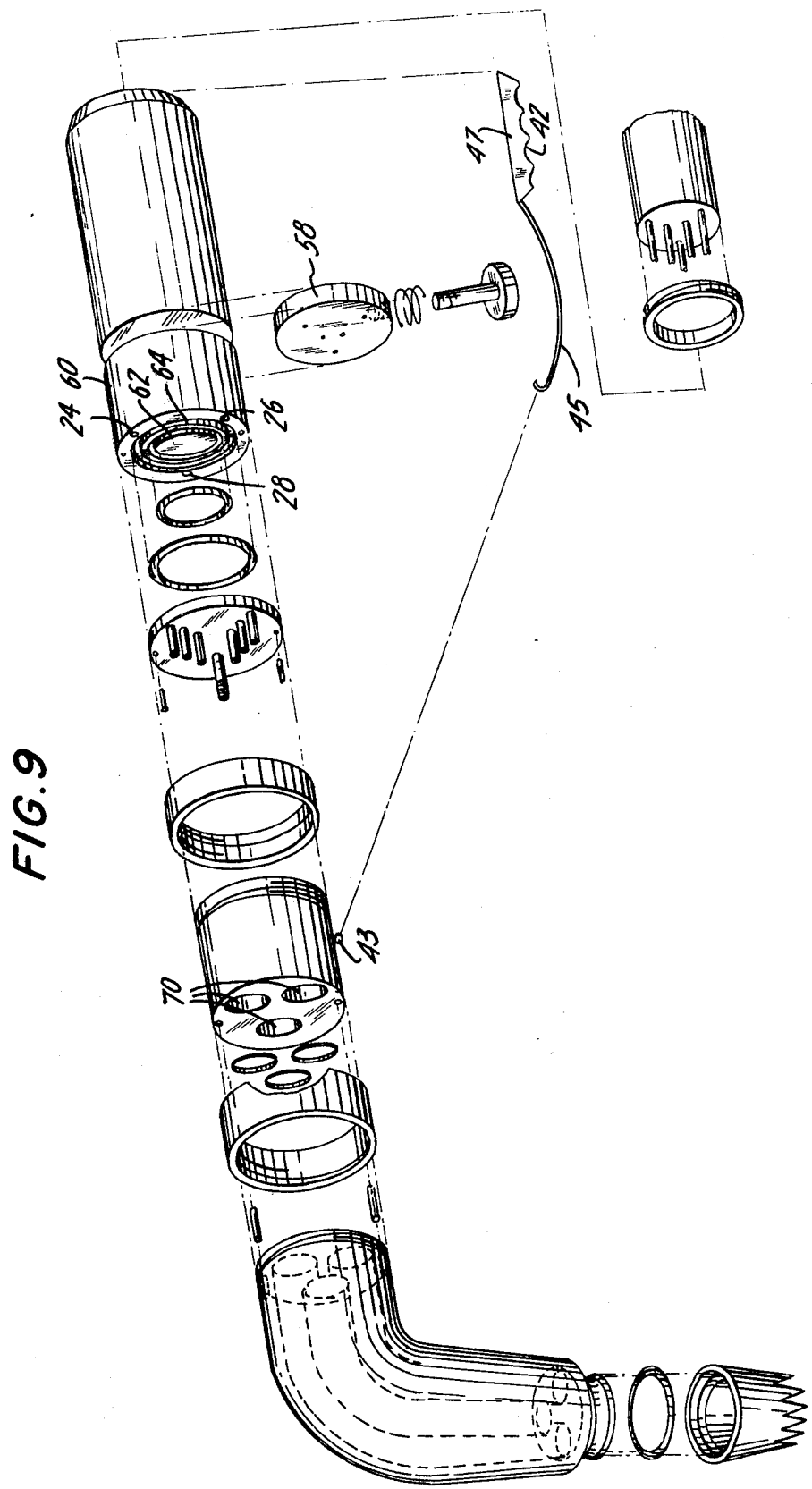
FIG. 9 is an exploded perspective view of the multi-flavor nozzle of the present system.

Following the disc 58, the cream and air channels 32 and 38 respectively, flow into a pair of concentric annuli chambers. This is more fully shown in FIG. 13 wherein it may be seen that line 38 flows into a so-called air annulus 38' while channel 32 flows into a concentrically disposed cream annulus 32'. The longitudinal element which embodies said annuli is illustrated as element 60 in FIG. 9. In said figure, it may be appreciated that the three color channels 24, 26, and 28 remain intact in outer disposition about the air annulus 38' and cream annulus 32'.

With reference to the manner in which the multicolor effect is attained, reference is made to FIGS. 15, 16, and 17 which provide radial cross-sectional views of an injection plate 66 (see FIG. 13). The injection plate 66 represents an interface between the cylindrical annuli segment 60 of the valve handle and the mixing area 68 of the valve handle. More particularly, the injection plate 66 covers the annuli segment (shown in FIG. 17) in the manner shown in FIG. 15 in which the annuli 62 and 64 are shown in dotted or phantom view with relation to the tertiary air and cream lines 38'' and 32'' respectively. That is, the three ducts 32'' serve to pick off, or tap, the cream annulus 32' at each of three locations; while the three tertiary air ducts 38'' serve to pick off the air annulus 38' at each of three locations.

To the left of the injection plate 66, as noted in FIG. 13, there are three sets of ducts, namely, Set A: 24, 32'' and 38''; Set B: 26, 32''; and 38''; and Set C: 28, 32'' and 38'' (not shown). These sets are fed into a plurality of channels 69 similar to channel 49 discussed above, which all open up into respective expansion chambers 70 resembling in construction chamber 50 of FIG. 4. Correspondingly, in like fashion, while in respective chambers 70, the three separate colors are fed through a number of screens and filters 72 and ultimately into the nozzle tip 74 out of which will flow a three-colored cream product.

With further respect to the handle design, it is noted that two retaining rings 76 and 78 are provided in order to secure the various above-described portions together.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

I claim:

1. An apparatus for the mixing and dispensing of a plurality of flowable, aerated, comestible materials, comprising:
    a. an elongated handle element having therein three longitudinal channels, and an output nozzle located on one end thereof, two of said channels providing, respectively a liquid and a gas, each of said channels extending substantially throughout the length of said handle element and corresponding to one component of said materials to be mixed, said handle element also including a first transverse bore located distal to said nozzle and a second transverse bore located proximal to said nozzle, said first bore positioned in contact with all of said channels and said second bore positioned in contact with only said liquid providing channel,
    b. a plunger positioned in said first bore having a plurality of transverse channels, said channels corresponding in position and cross-section to said longitudinal channels of said handle element, said plunger also including a biasing means externally mounted about said plunger and protruding from said handle element, wherein a selectable open-close function of said channels is obtained through the application of external pressure to said biasing means;
    c. an overrun control valve having a channel corresponding in position and cross-section to said liquid-containing channel, said valve disposed within said second transverse bore wherein, upon rotation of said valve, the ratio of gas to liquid and, thereby, the consistency of the end-product can be regulated; and
    d. a blending area located intermediate said channels and said nozzle, said blending area comprising a singular channel axially integral with said longitudinal channels and providing the junction thereof, and a conically diverging, increased diameter expansion chamber integral with said singular channel, said expansion chamber promoting the homogeneous mixture of said materials 2. An apparatus for mixing and dispensing a plurality of flowable, serated comesitble materials, comprising:
    a. a primary flow area having an air input, a cream input and a plurality of color-flavor inputs, all of said inputs integral with corresponding longitudinal channels said corresponding longitudinal channels comprising an air channel, a cream channel, and a plurality of color-flavor channels;
    b. a plunger disc having a plurality of orifices, said orifices corresponding in position and cross-section to each of said longitudinal channels of said primary flow area, said plunger disc also including a biasing means externally mounted about said disc and said first primary flow area, whereby a selectable open-close function of said channels is achieved by the application of external pressure to said biasing means;
    c. a secondary flow area longitudinally aligned with said primary flow area, said secondary area including: a first internal annulus in radial alignment with said cream channel extending from said primary flow area; a second internal annulus concentric about said first annulus in radial alignment with said air channel extending from said primary flow area; and a plurality of color-flavor channels in radial alignment with said plurality of color-flavor channels in said primary flow area, wherein said plunger-disc effectuates an open-close function between said primary and secondary flow area;
    d. an injection plate having a plurality of groups of orifices, each group corresponding to an air-cream-color output of said secondary flow area;
    e. a tertiary flow area having a plurality of groups of said longitudinal channels, said plurality of groups of channels corresponding to said plurality of groups of orifices of said injection plate, each group further corresponding to a separate color-flavor, air-cream mixture, wherein each of said groups of channels extends into separate blending areas, each of said blending areas comprising a singular channel axially integral with said longitudinal channels and providing the junction thereof, and a conically diverging, increased diameter expansion chamber integral with said singular channel; and
    f. a dispensing nozzle into which the expanded outputs of said expansion chambers are individually fed thereby producing a multi-color comestible end-product exhibiting a plurality of homogenously-colored and flavored areas within a single serving.

* * * * *